United States Patent

Schmidt

[11] Patent Number: 6,007,442
[45] Date of Patent: Dec. 28, 1999

[54] MULTIPLE SPROCKET FOR A BICYCLE GEAR SHIFTING MECHANISM

[75] Inventor: Frank Schmidt, Schweinfurt, Germany

[73] Assignee: SRAM Deutschland GmbH, Schweinfurt, Germany

[21] Appl. No.: 09/016,842

[22] Filed: Jan. 30, 1998

[30] Foreign Application Priority Data

Feb. 4, 1997 [DE] Germany .................. 197 03 930

[51] Int. Cl.⁶ .......................... F16H 7/22; F16H 55/12
[52] U.S. Cl. .......................... 474/122; 474/160
[58] Field of Search ................... 474/152, 155, 474/156, 157, 158, 160, 164, 122

[56] References Cited

U.S. PATENT DOCUMENTS

| | | | |
|---|---|---|---|
| 5,078,653 | 1/1992 | Nagano | 474/160 |
| 5,087,226 | 2/1992 | Nagano | 474/160 |
| 5,123,878 | 6/1992 | Nagano | 474/160 |
| 5,188,569 | 2/1993 | Kobayashi | 474/160 |
| 5,192,248 | 3/1993 | Nagano | 474/160 |
| 5,458,543 | 10/1995 | Kobayashi | 474/160 |
| 5,609,536 | 3/1997 | Hsu | 474/160 |
| 5,632,699 | 5/1997 | Nakamura | 474/160 |
| 5,690,570 | 11/1997 | Chang et al. | 474/160 |
| 5,759,124 | 6/1998 | Sung | 474/160 |

FOREIGN PATENT DOCUMENTS

| | | | |
|---|---|---|---|
| 0 538 780 A1 | 4/1993 | European Pat. Off. | B62M 9/10 |
| 44 45 035 | 6/1996 | Germany | B62M 9/12 |

*Primary Examiner*—Thomas R. Hannon
*Assistant Examiner*—Matthew A. Kaness
*Attorney, Agent, or Firm*—Cohen, Pontani, Lieberman & Pavane

[57] ABSTRACT

A gearshift mechanism has at least two sprocket wheels on a set of driving sprocket wheels or a set of driven sprocket wheels, having shifting aids to facilitate shifting a chain up and down, it being possible for the shifting to take place under load. The shifting aids include cone rivets, which project axially out of the sprocket wheel plane and are arranged beneath the toothing of the larger one of the at least two sprocket wheels. The at least two sprocket wheels have different numbers of teeth which are selected for having the highest common divisor possible, the purpose of which is to provide as many shifting aids as possible. The positions of the sprocket wheels with respect to one another in the circumferential direction and the position of the shifting aids with respect to the teeth of the larger one of the at least two sprocket wheels are also optimized to ensure a smooth transfer of the chain from one sprocket to another.

4 Claims, 5 Drawing Sheets

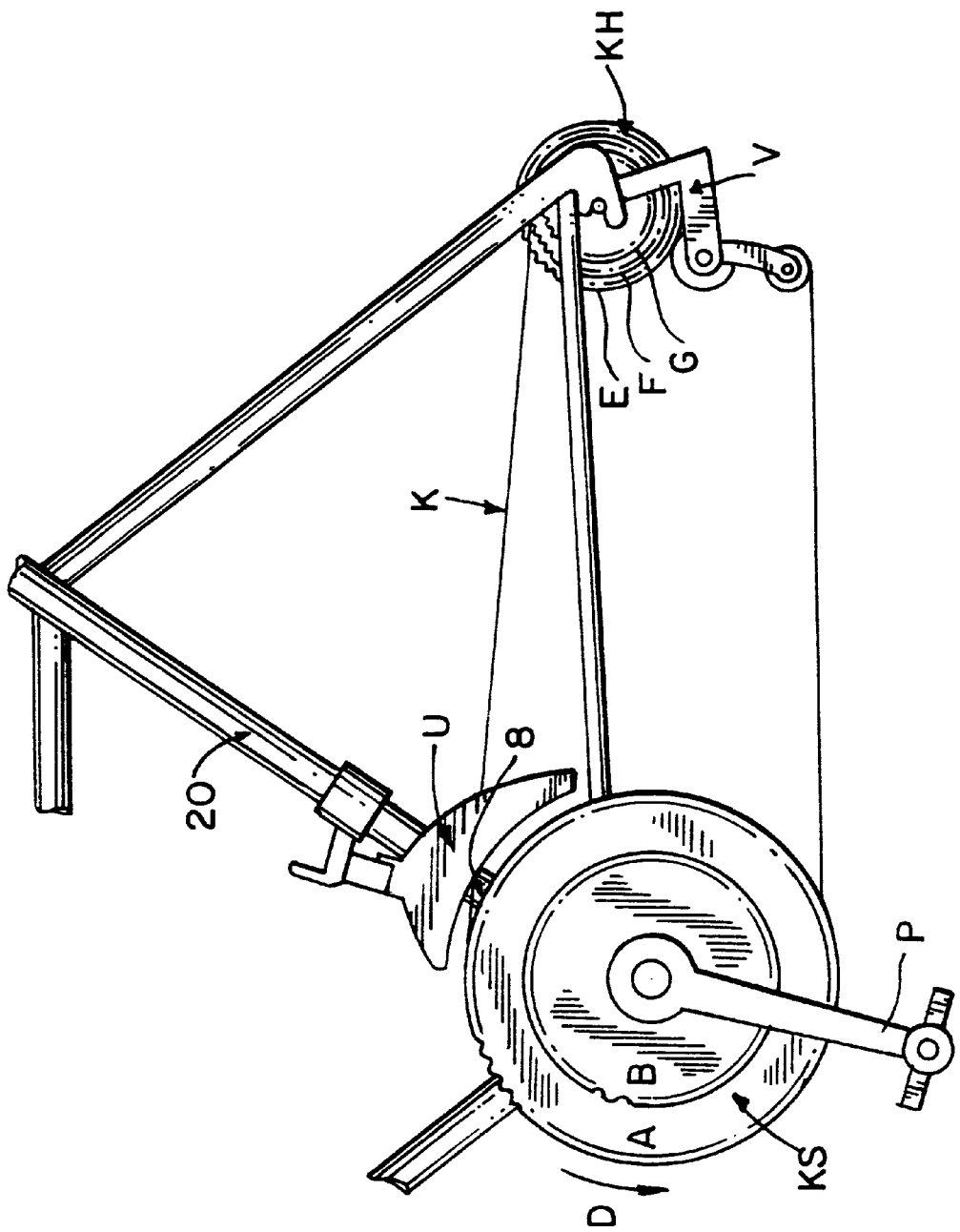

MULTIPLE SPROCKET FOR A BICYCLE GEAR SHIFTING MECHANISM

BACKGROUND OF THE INVENTION

1. Field of the Invention

The invention relates to a gearshift mechanism for bicycles having a shifting aid which facilitates shifting a chain from a larger to a smaller sprocket and shifting back to the larger sprocket.

2. Description of the Related Art

German reference DE 44 45 035 C1 discloses a gearshift mechanism for a bicycle with a set of driving sprocket wheels, the larger sprocket wheel of which has shifting aids on its side facing the smaller sprocket wheel. The shifting aids, which are in the form of cone rivets, facilitate shifting from the smaller sprocket wheel to the larger sprocket wheel. These cone rivets project from the side of the larger sprocket, but are out of the running plane of the chain. If the chain is moved axially towards these aids by a shifting device, the cone rivets pick up the chain, thus facilitating shifting the chain onto the respectively larger sprocket wheel. On the other hand, although shifting the chain from the larger sprocket wheel to the smaller sprocket wheel is simpler, the cone rivets are not involved in controlled deflection of the chain during that process. Therefore, the chain can be shifted even at transfer areas of the sprocket which were not designed for that purpose.

SUMMARY OF THE INVENTION

The object of the invention is to provide a set of sprocket wheels which, in addition to having a maximum possible number of chain-transfer regions, includes a shifting aid which facilitates shifting the chain from the larger to the smaller sprocket wheel and when shifting from the smaller to the larger sprocket wheel under load.

The proposal according to the invention provides the improvement, in addition to shifting the chain from the smaller onto the larger sprocket wheel, for accurately shifting the chain from the larger sprocket wheel back to the smaller sprocket wheel. The chain, after leaving the toothing of the larger sprocket wheel, is supported on a cone rivet which is used as a chain-guiding device allowing the chain to smoothly transfer to the toothing of the smaller sprocket wheel. The cone is also used to pick up the chain and thereby facilitate shifting the chain onto the larger sprocket wheel. If the sprocket wheels are set at the correct angle with respect to one another when they are mounted on the bottom bracket bearing, the teeth of the smaller sprocket wheel can engage precisely in the gaps between the joints of the chain and, under load, effect a smooth transfer.

Another advantage of the invention is that the gear set includes the highest possible number of chain-transfer regions. This is achieved by the fact that all the sprocket wheels forming part of the set of driving sprocket wheels have numbers of teeth that have a common divisor, which is to be as high as possible. The magnitude of the common divisor is equal to the number of chain-transfer regions. For example, if a set of sprocket wheels has three sprocket wheels, with 50, 40 and 30 teeth, the common divisor is 10, which also corresponds to the number of possible chain-transfer regions.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The shifting options for the chain are described with reference to two sprocket wheels. In the figures:

FIG. 5 shows a schematic view of the gear set of FIG. 1 mounted on a bicycle.

DETAILED DESCRIPTION OF THE PRESENTLY PREFERRED EMBODIMENTS

Figure 1:
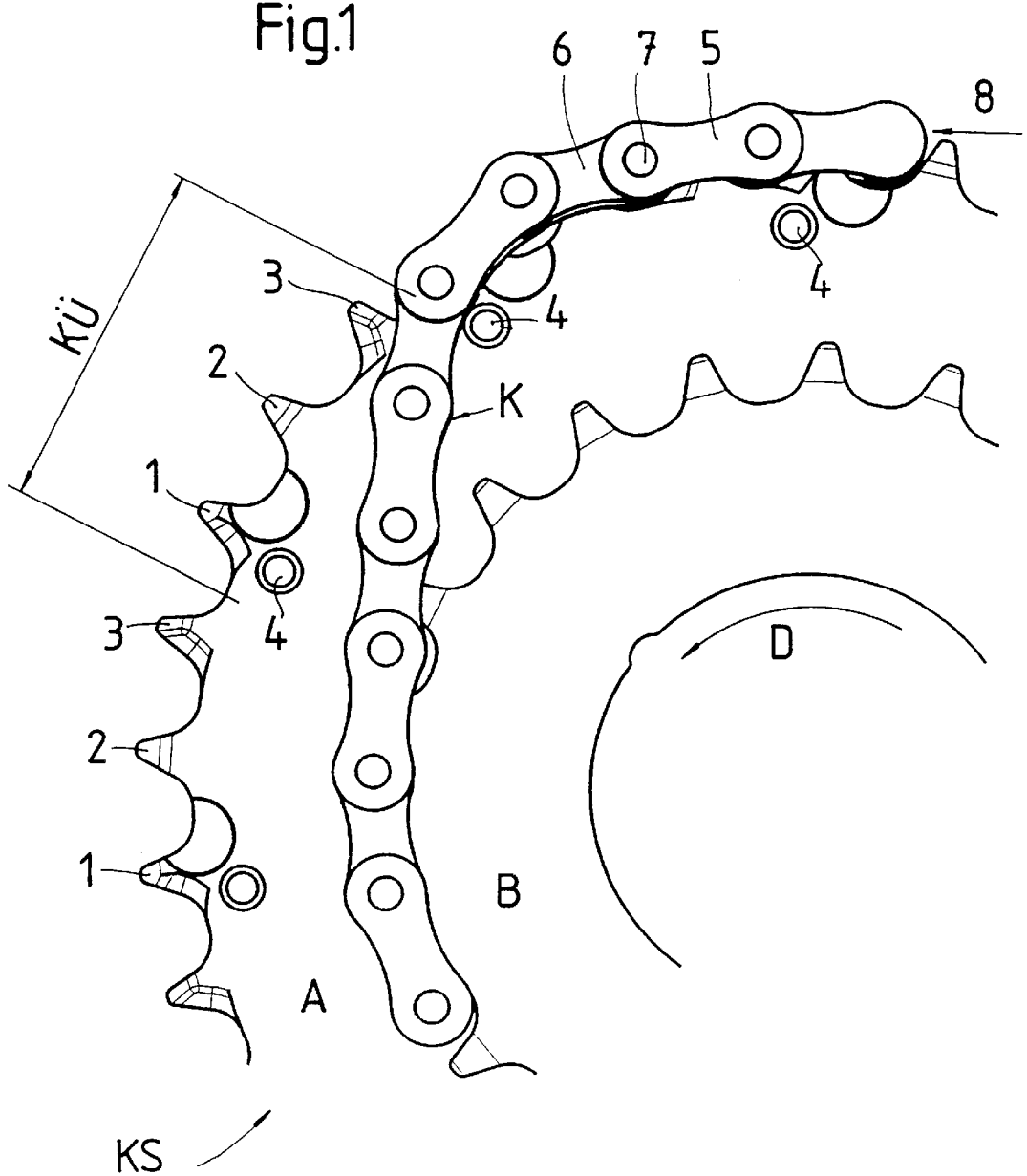
FIG. 1 shows an embodiment of a gear set of the present invention with a larger and a smaller sprocket wheel, and a chain which is being shifted from the smaller to the larger sprocket wheel.

FIG. 1 shows a segment of a gear set KS having a larger sprocket wheel A and a smaller sprocket wheel B. The larger sprocket wheel A has toothing with a first tooth 1, a second tooth 2, and a third tooth 3, which are shaped differently from each other. This sequence of the first second and third teeth 1, 2, and 3 extends over the entire circumference of the larger sprocket wheel A. The smaller sprocket wheel B likewise has toothing, the teeth 10 of which are identical to one another. Also shown is a chain K, which comprises outer link plates 5, inner link plates 6, and pivot joints 7 for connecting the outer link plates 5 to the inner link plates 6. Chain K is illustrated in FIG. 1 at a shifting position which occurs when it is being shifted by an axial control action of a shift device (not shown in FIG. 1) out of the toothing of the smaller sprocket wheel B onto the toothing of the larger sprocket wheel A. During this shifting procedure, at the location of one of the pivot joints 7, the chain K moves onto a cone rivet 4, which projects axially out of the plane of the larger sprocket wheel A and thus helps the chain to move upwards. From the cone rivet 4, the chain K runs laterally into the toothing of the larger sprocket wheel A. The chain K extends at the location of a chain run-in region 8 from the set of driven sprocket wheels (not shown) to the set of driving sprocket wheels KS. The shift device acts on chain K at the chain run-in region 8 and effects an axial displacement of the chain K.

When shifting from the smaller sprocket wheel B to the larger sprocket wheel A (hereafter referred to as shifting up), the chain K is thus always supported by one of the cone rivets 4, the contact location on the chain K always being at one of the pivot joints 7, with overlapping outer link plates 5 and inner link plates 6. If an outer link plate 5 arrives at the second tooth 2, this link plate 5 is caught on the second tooth 2 and runs in meshing engagement with the large sprocket wheel A from the second tooth 2. At the level of the second and third teeth 2 and 3, the chain K will not yet lie completely in the toothing of the sprocket wheel A, but rather will rise briefly above the pitch circle. Under load, this will also cause the chain K to twist, but this is not harmful and will assist the subsequent meshing engagement of the chain K in the toothing. If, when shifting up, one of the inner link plates 6 arrives at the second tooth 2, the chain will first be caught on the third tooth 3 via the following outer link plate 5, from where it continues to run into the toothing of the larger sprocket wheel A, forming a slight rise.

Figure 2:
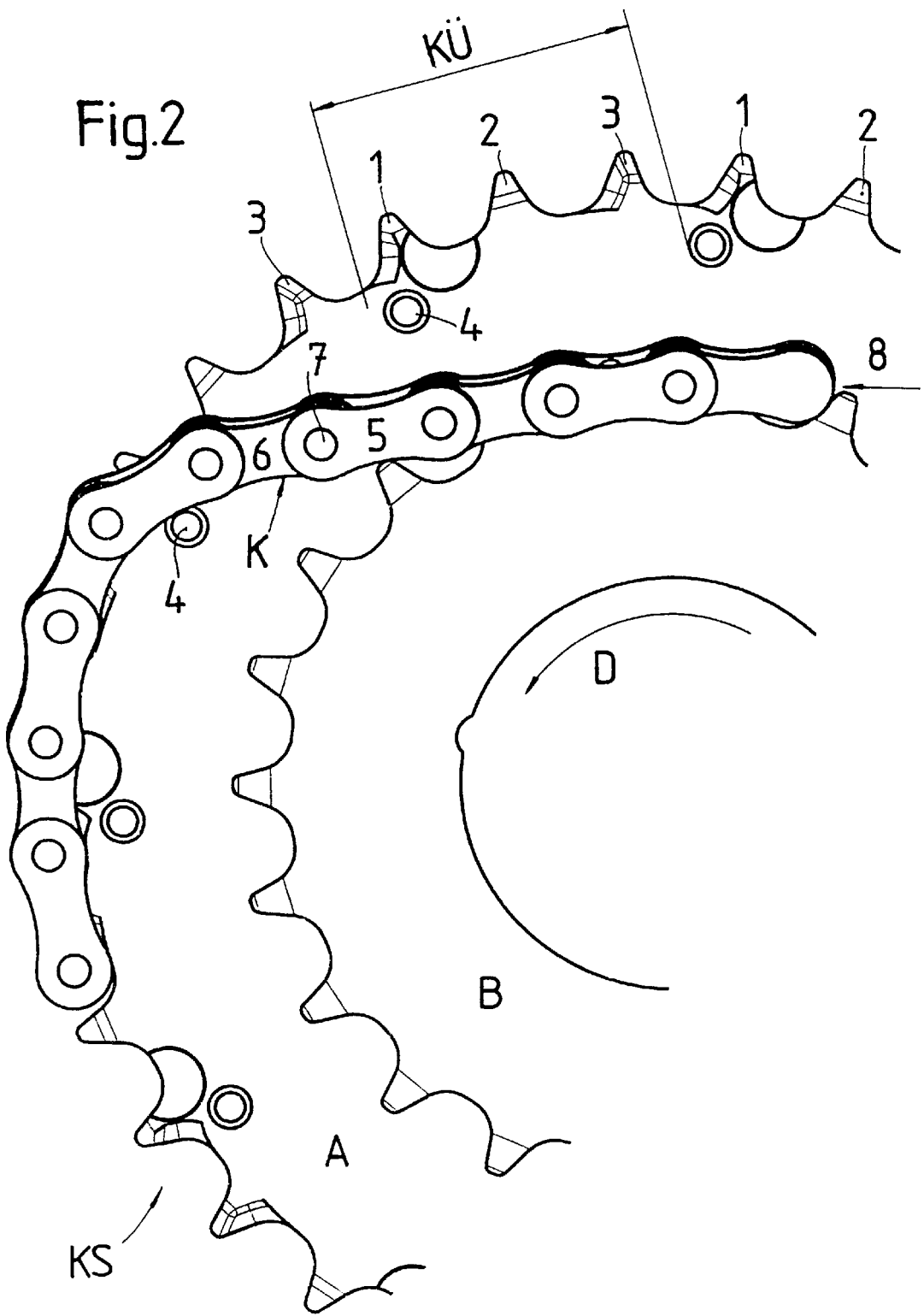
FIG. 2 shows the gear set of FIG. 1 with the chain in a position in which it is being shifted from the larger to the smaller sprocket wheel.

FIG. 2 shows a chain K which is being shifted from the larger sprocket wheel A to the smaller sprocket wheel B (hereafter called shifting down). After the chain K has been shifted, the chain run-in region 8 is thus situated at the smaller sprocket wheel B. Shifting down is effected by a force of the shift device (also not shown in FIG. 2) on the chain K applied at a preferred location in the chain-transfer region KÜ. The preferred location is at the second tooth 2 when there is an outer link plate 5 aligned with the second tooth 2. That configuration allows the inner link plate 6 to leave the toothing of the large sprocket wheel A at the third tooth 3. Since both inner link plates 6 are already outside the plane of the larger sprocket wheel A, the outer link plate 5 is supported on the cone 4 and the chain K is optimally transferred into the toothing of the smaller sprocket wheel B.

If an inner link plate 6 is aligned on the second tooth 2, the chain K cannot yet leave the larger sprocket wheel A at the third tooth 3, since the guidance of the chain K by the inner link plate 6 prevents this. The inner link plate 6 can only come out of meshing engagement one tooth later, i.e. on the first tooth 1. In this configuration, the chain K is no longer supported on the cone rivet 4. Nevertheless, the toothing ratios are such that they facilitate the smooth transfer of chain K onto the toothing of the smaller sprocket wheel B when shifting down.

Figure 3:
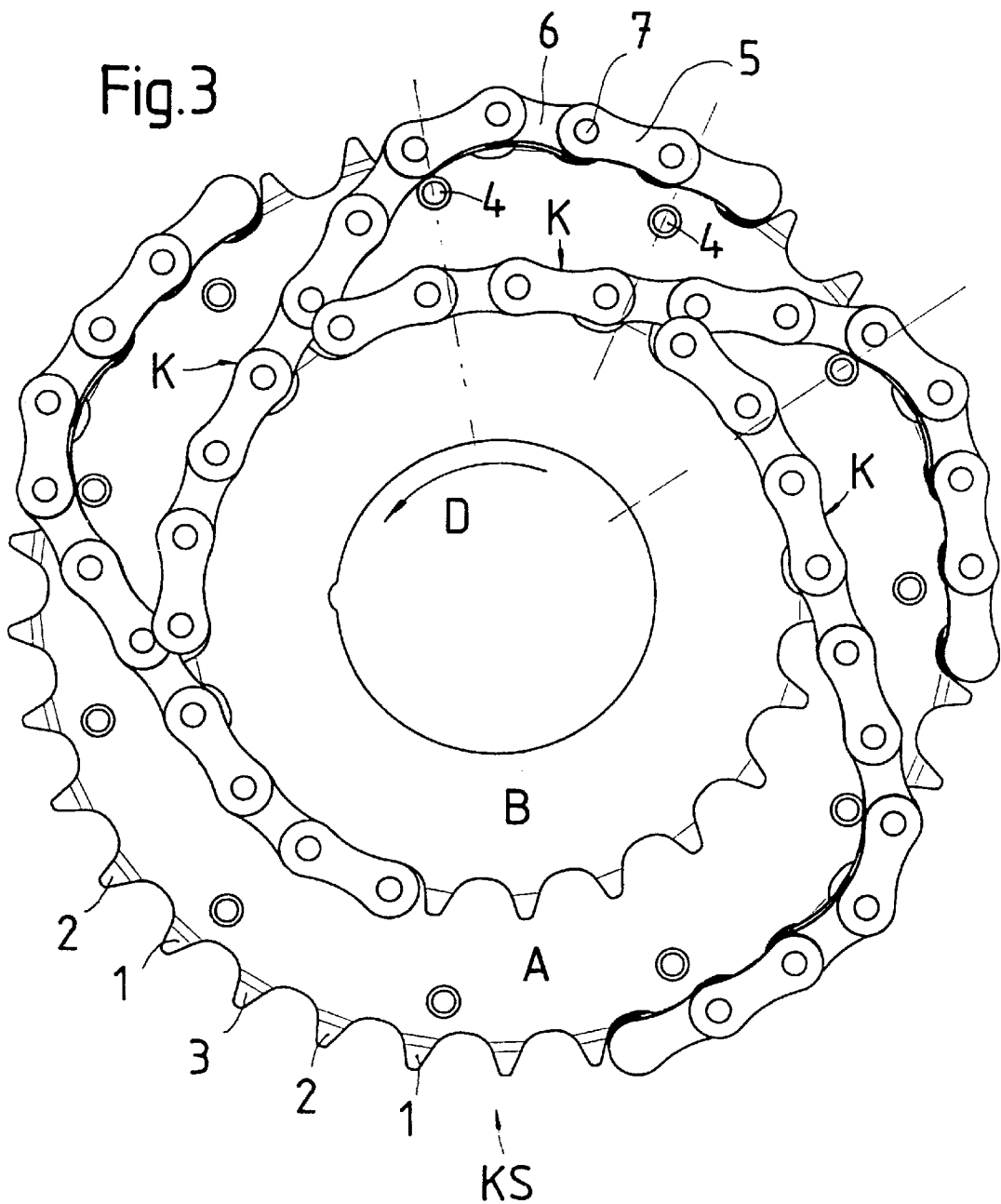
FIG. 3 shows the gear set of FIG. 1 illustrating four different positions of the chain being shifted from the smaller to the larger sprocket wheel, in four of eleven possible shifting positions.

FIG. 3 shows four of the eleven possible positions for shifting the chain K from the smaller sprocket wheel B to the larger sprocket wheel A. FIG. 3 shows that it is necessary, for the condition of the chain-transfer region KÜ having first, second, and third teeth 1, 2, and 3 on the larger sprocket wheel A, for there to be available a chain-transfer region KÜ on the smaller sprocket B which has an integer number of teeth which is less than three. The position of the two sprocket wheels A and B and the position of the cone rivet 4 must be adapted so that the chain K runs in optimally when shifting up and down. Furthermore, the first, second, and third teeth 1, 2, and 3 are each provided with different types of bevels, which assist or prevent, i.e. optimize, the shifting of the chain K when shifting up and down.

Figure 4:
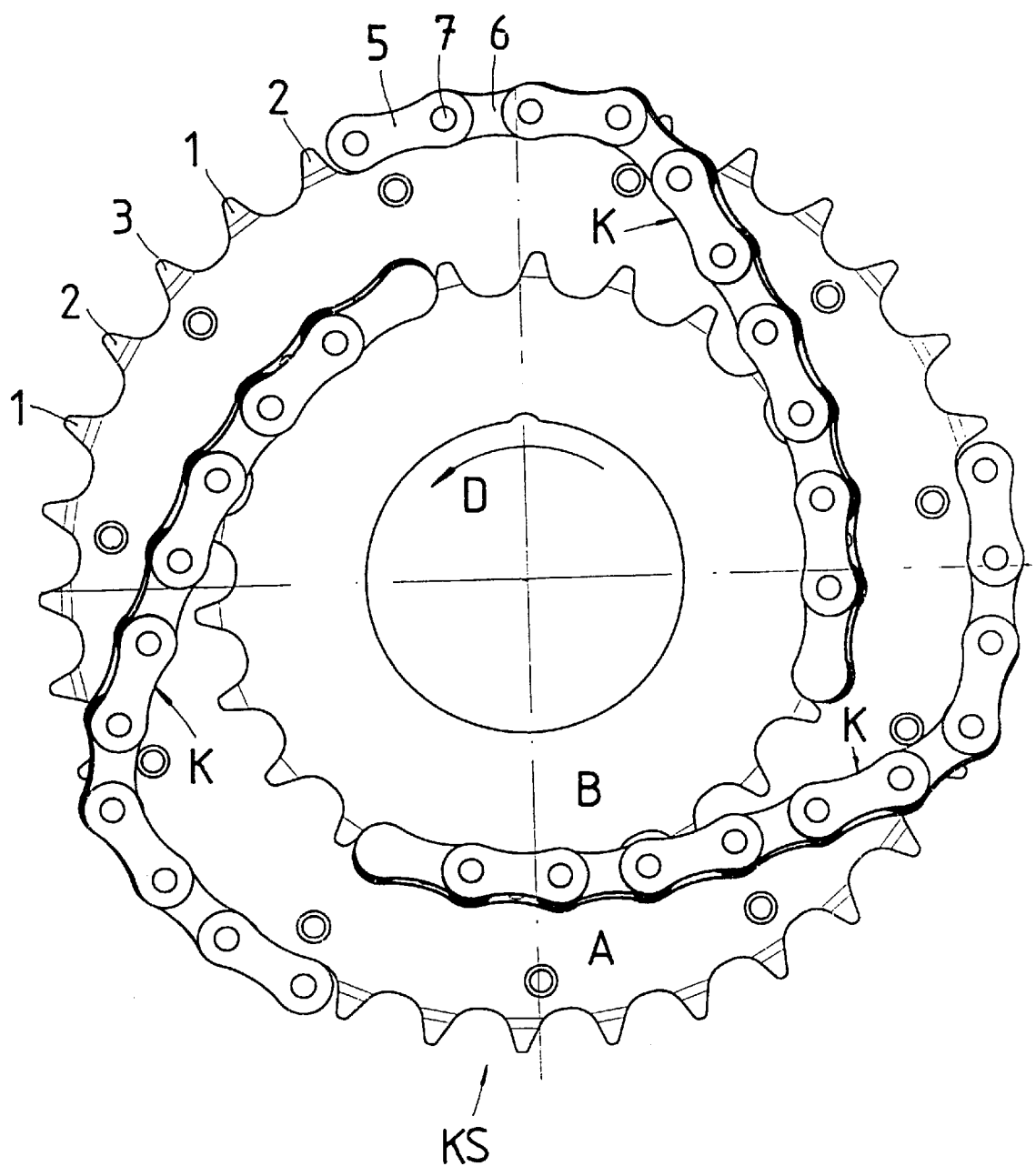
FIG. 4 shows the gear set of FIG. 1 and a chain in three of eleven shifting positions when shifting from the larger to the smaller sprocket wheel.

FIG. 4 shows the sprocket wheels A and B in accordance with FIG. 3, with three positions of chain K illustrated in three of eleven possible shifting positions when shifting down.

In the examples shown in FIGS. 3 and 4, the number of teeth on the larger sprocket wheel A is 33 and the number of teeth on the smaller sprocket wheel B is 22. The large common divisor is thus eleven, and consequently the number of cone rivets 4 and the number of possible shifting positions are likewise eleven. By extension of this principle, a third, largest sprocket wheel suitable for this gear set would have to have 44 teeth, and likewise eleven cone rivets 4 and a chain-transfer region KÜ of four teeth. Examples of further gear sets of three sprocket wheels would be:

a gear set having sprockets with 20-30-40 teeth; the divisor being 10;

a gear set having sprockets with 24-36-48 teeth; the divisor being 12; and a gear set having sprockets with 33-44-55 teeth; the divisor being 11.

Gear sets of two sprocket wheels may be paired as follows:

a gear set having sprockets with 40-50 teeth; the divisor being 10;

a gear set having sprockets with 44-55 teeth; the divisor being 11; and a gear set having sprockets with 36-48 teeth; the divisor being 12.

FIG. 5 shows the arrangement of the set of driving sprocket wheels KS mounted on a bicycle 20. The set of driving sprocket wheels KS are driven by pedals P (only one of which is shown). Chain K is connected around the set of driving sprockets KS and a set of driven sprockets KH for driving the bicycle 20 when the a driving force is applied to the pedals P. A shifting device U axially displaces the chain K with respect to the axis of rotation of the set of driving sprockets KS for effecting a shifting of the chain K between the larger sprocket A and the smaller sprocket B of the driving sprocket wheels KS. Another shifting device V axially displaces the chain K at the driven sprocket wheels KH to effect shifting the chain K between the driven sprocket wheels EFG. Although the Figures and description depict the invention as embodied on the driving sprocket wheel KS, the invention may also be embodied on the driven sprocket wheel KH.

The invention is not limited by the embodiments described above which are presented as examples only but can be modified in various ways within the scope of protection defined by the appended patent claims.

I claim:

1. A gearshift mechanism for a bicycle, comprising:

a first gear set comprising driving sprocket wheels rotatably mounted on said bicycle;

a second gear set comprising driven sprocket wheels rotatably mounted on said bicycle;

a continuous chain drivingly connecting said first gear set and said second gear set and having outer link plates, inner link plates, and pivot joints for joining each adjacent pair of outer link plates and inner link plates;

one of the driving sprocket wheels and the driven sprocket wheels comprising a small sprocket wheel having a first number of teeth and a large sprocket wheel having a second number of teeth, the first number of teeth and the second number of teeth having a large common divisor;

a shifting device operatively connected to said bicycle for alternately shifting the chain between said small sprocket wheel and said large sprocket wheel;

the larger sprocket wheel comprising at least one cone rivet operatively connected on a side of said larger sprocket wheel facing said smaller sprocket wheel, for lifting the chain up onto the larger sprocket wheel from the smaller sprocket wheel when said chain is shifted from said smaller sprocket wheel to said larger sprocket wheel by said shifting device; and a plurality of chain-transfer regions, each spanning at least three adjacent teeth, arranged successively at intervals around the circumference of the larger sprocket wheel, said at least one cone rivet being operatively arranged for guiding said chain from said larger sprocket wheel through one of said plural chain-transfer regions onto said smaller sprocket wheel when said chain is shifted from said larger sprocket wheel to said smaller sprocket wheel by said shifting device.

2. The gearshift mechanism of claim 1, wherein the common divisor of the first number of teeth and the second number of teeth lies in a range of 8 to 12.

3. A gearshift mechanism for a bicycle, comprising:

a first gear set of driving sprocket wheels rotatably mounted on said bicycle;

a second gear set of driven sprocket wheels rotatably mounted on said bicycle;

a chain drivingly connecting said first gear set and said second gear set and having outer link plates, inner link plates, and pivot joints connecting adjacent pairs of said outer link plates and inner link plates;

one of the driving sprocket wheels and the driven sprocket wheels comprising a large sprocket wheel and a small sprocket wheel;

a shifting device operatively connected to said bicycle for alternately shifting the chain between the smaller sprocket wheel and the larger sprocket wheel;

the larger sprocket wheel further comprising at least one cone rivet operatively positioned relative to an axial distance between said large sprocket and said small sprocket for facilitating a shifting of the chain to the larger sprocket by lifting the chain upwards when the chain is shifted from the smaller sprocket wheel onto the larger sprocket wheel and operatively positioned at an angular distance to said smaller sprocket wheel for guiding the chain into a meshing engagement with the smaller sprocket when the chain is shifted from the larger sprocket wheel onto the smaller sprocket wheel.

4. The gearshift mechanism of claim 3, wherein the larger sprocket wheel further comprises a repeated sequence of teeth extending therearound, wherein each tooth of said repeated sequence of teeth comprises a bevel operatively formed for ensuring that the chain, when shifting from the larger sprocket wheel onto the smaller sprocket wheel, first comes out of a meshing engagement with the large sprocket wheel in the axial direction at the location of the inner link plate and a second tooth of said sequence; and said at least one cone rivet being operatively positioned relative to said second tooth of said sequence for supporting said chain as a chain-guiding device when said chain is shifted from said larger sprocket to said smaller sprocket at the location of the inner link plate and the second tooth of said sequence.

* * * * *